United States Patent [19]

Richard et al.

[11] Patent Number: 5,522,926
[45] Date of Patent: Jun. 4, 1996

[54] METHOD AND A COMPOSITION FOR PREPARING CONCRETE ELEMENTS HAVING REMARKABLE COMPRESSIVE STRENGTH AND FRACTURE ENERGY, AND ELEMENTS OBTAINED THEREBY

[75] Inventors: Pierre Richard, Neuilly Sur Seine; Marcel H. Cheyrezy, Sevres; Jérôme Dugat, Montigny le Bretonneux, all of France

[73] Assignee: Bouygues, Saint Quentin Yvelines, France

[21] Appl. No.: 268,989

[22] Filed: Jun. 30, 1994

[30] Foreign Application Priority Data

Jul. 1, 1993 [FR] France ................................ 93 08062
Mar. 10, 1994 [FR] France ................................ 94 02800

[51] Int. Cl.$^6$ .................................................. C04B 14/48
[52] U.S. Cl. ........................ 106/644; 106/643; 106/737; 106/816
[58] Field of Search ........................ 106/643, 644, 106/737, 816

[56] References Cited

U.S. PATENT DOCUMENTS

| | | | |
|---|---|---|---|
| 2,463,561 | 3/1949 | Riley | 106/644 |
| 4,159,911 | 7/1979 | Takazuka | 106/644 |
| 4,298,660 | 11/1981 | Nakagawa | 106/644 |
| 4,792,361 | 12/1988 | Double et al. | 106/717 |
| 5,298,071 | 3/1994 | Vondran | 106/757 |

FOREIGN PATENT DOCUMENTS 952817  8/1982  U.S.S.R. ................................ 106/644

*Primary Examiner*—Anthony Green
*Attorney, Agent, or Firm*—Lowe, Price, LeBlanc & Becker

[57] ABSTRACT

A method and composition for preparing concrete elements comprising the steps of mixing a composition comprising the following components expressed in parts by weight (p):

a) 100 p of Portland cement;

b) 30 p to 100 p or better 40 p to 70 p of fine sand having a grain size of at least 150 micrometers;

c) 10 p to 40 p or better 20 p to 30 p of amorphous silicon having a grain size of less than 0.5 micrometers;

d) 20 p to 60 p or better 30 p to 50 p of ground quartz having a grain size of less than 10 micrometers;

e) 25 p to 100 p, or better 45 p to 80 p of steel wool;

f) a dispersing agent;

g) 13 p to 26 p or better 15 p to 22 p of water; and after setting, curing the concrete at a temperature of 250° C. or higher, for a length of time sufficient to transform cement hydration products into crystalline hydrates of the xonotlite type; thus eliminating substantially all of the free water and at least the main part of the adsorbed and chemically bonded water.

17 Claims, 4 Drawing Sheets

COMPRESSIVE STRENGTH AS A FUNCTION OF RESIDUAL WATER RATIO

FIG_3

FIG. 4
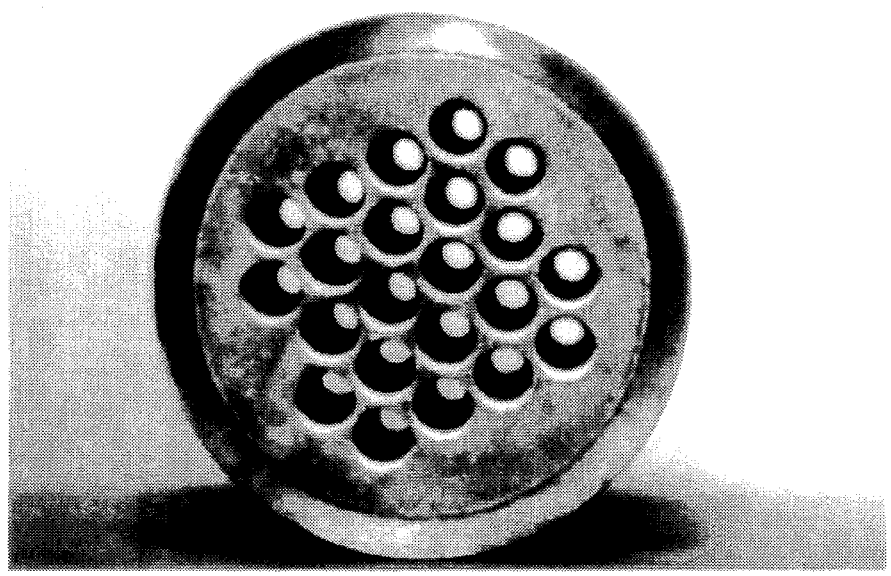
FIG. 5

METHOD AND A COMPOSITION FOR PREPARING CONCRETE ELEMENTS HAVING REMARKABLE COMPRESSIVE STRENGTH AND FRACTURE ENERGY, AND ELEMENTS OBTAINED THEREBY

BACKGROUND AND SUMMARY OF THE INVENTION

The invention relates to the production of concrete elements having a compressive strength of not less than 400 MPa and fracture energy of not less than 1,000 J/m$^2$, prefabricated or cast in-situ.

According to the invention, to obtain such results, a method is provided comprising the steps of mixing a composition comprising the following components expressed in parts by weight (p):

a) 100 p of Portland cement;

b) 30 p to 100 p or better 40 p to 70 p of fine sand having a grain size of at least 150 micrometers;

c) 10 p to 40 p or better 20 p to 30 p of amorphous silicon having a grain size of less than 0.5 micrometers;

d) 20 p to 60 p or better 30 p to 50 p of ground quartz having a grain size of less than 10 micrometers;

e) 25 p to 100 p, or better 45 p to 80 p of steel wool;

f) a dispersing agent;

g) 13 p to 26 p or better 15 p to 22 p of water; and after setting, curing the concrete at a temperature of 250° C. or higher, for a length of time sufficient to transform cement hydration products into crystalline hydrates of the xonotlite type; thus eliminating substantially all of the free water and at least the main part of the adsorbed and chemically bonded water.

The use of sand aggregates, specially of siliceous sand, provides a high bond strength at the interface aggregates/past of cement, silica and water.

It is known that concrete can be cured in an autoclave to transform amorphous hydrates of concrete of the [CaO SiO$_2$, H$_2$O] type into a crystalline hydrate known as tobermorite whose formula Is [CaO]$_5$ [SiO$_2$]$_6$, [H$_2$O]$_5$, however that technique does not constitute a satisfactory solution to the present problem since tobermorite includes five times more water than xonotlite whose formula is [CaO]$_6$ [SiO$_2$]$_6$ [H$_2$O]$_1$.

Preferably the transformation of the hydration product of the cement is obtained merely by heating, under ambient conditions of pressure and humidity.

In a particular embodiment of the invention, a concrete is prepared having an accumulated porosity of less than 0.01 cm$^3$/gram (as measured using a mercury porosimeter), containing ground quartz and steel wool, constituted by ground steel shavings and is cured after setting to a temperature not less than 250° C., and preferably of not less than 400° C., under ambient conditions of pressure and humidity, for a length of time sufficient to obtain and transform cement hydration products into crystalline hydrates of the xonotlite type.

The water vapor generated during heating remains confined within the concrete because of its low porosity. The ground quartz facilitates the formation of crystalline hydrates that are richer in CaO than the amorphous hydrates, and the steel wool impart sufficient strength to the matrix during the transitional stage when the water vapor pressure in the pores is at a maximum.

Under such conditions, the entrapped water vapor achieves the hydrothermal conditions within the concrete that are required for transforming amorphous or semi-crystalline hydrates into crystals of xonotlite.

Curing generally lasts for a period of several hours.

A typical sequence for hot curing is given in FIG. 1. The ratio of residual water to initial water is plotted on the vertical axis. It can be seen than it takes a long time to reach constant weight at a given temperature. In practice, the curing sequence can be accelerated when higher temperatures are used.

Preferably, the grain size of the fine sand is less than 800 micrometers, and more preferably in the range 150–400 micrometers.

Preferably, at least 0.6 p, or better at least 1.4 p of a super plasticizer is added to the composition.

Preferably steel wool is made of steel shavings ground to 1 mm to 5 mm (size of the cutting grid of the grinder).

Preferably Portland cement is of type Vor III or a high silica modulus cement.

Preferably the concrete is pressurized before and during setting at a pressure in the range 5 MPa–50MPa.

According to the invention, an addition to the composition of 1 to 4%, preferably 2 to 3%, (in volume with respect to the volume of the concrete after setting) of metal fibers having a diameter smaller than about 500 micrometers, preferably An the range 100–200 micrometers, a length in the range of 4 mm–20 mm, preferably 10 mm–14 mm, improves considerably the flexural strength and the fracture energy.

The invention will be illustrated hereafter with some typical examples.

BRIEF DESCRIPTION OF THE DRAWINGS

In the drawings

FIG. 4 is a scanning electron micrograph of the microstructure of a concrete element according to the invention, and FIG. 5 is an elevational view of a prestressing anchoring head obtained according to the invention.

DESCRIPTION OF THE PREFERRED EMBODIMENTS

Example 1

Samples of concrete were prepared by mixing components with the following proportions, per 100 parts by weight (p) of Portland cement:

50 p of fine sand (grain size 150 micrometers to 400 micrometers);

23 p of amorphous silica fume (grain size less than 0.5 micrometers);

39 p of ground quartz (grain size less than 10 micrometers);

2 p of superplasticizer (dry extract);

63 p of AISI 430 stainless steel shavings ground to 3 mm (size of the cutting grid in the grinding machine), as sold by Gervois; and 18 p of water.

The super plasticizer was of the polyacrylate, melamine, or naphthalene type, for example.

Figure 1:
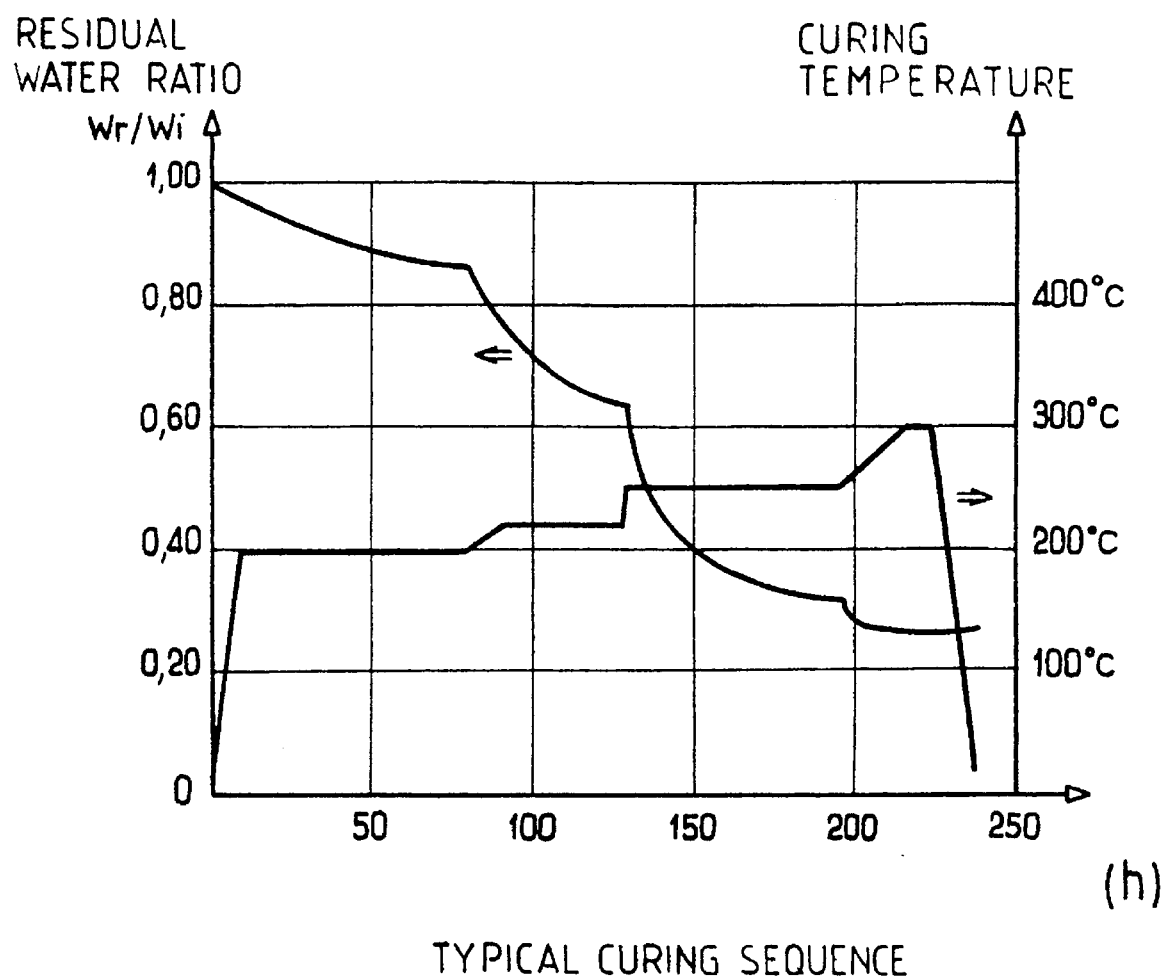
FIG. 1 is a graph of a typical curing sequence of a concrete element according to the invention.
Figure 2:
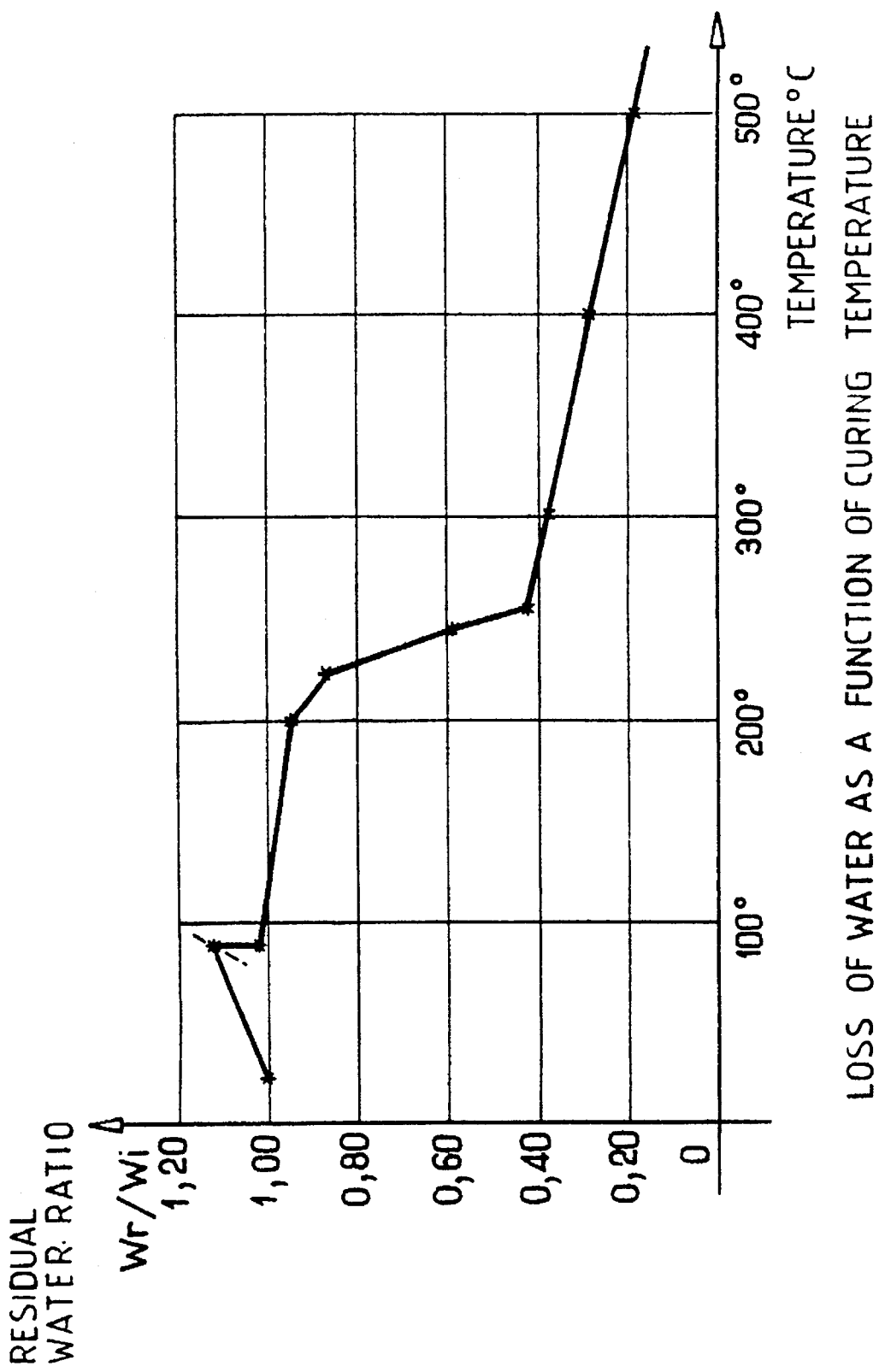
FIG. 2 is a curve of the loss of water of a concrete element as a function of curing temperature.

The samples were cured at different temperatures and the desiccation of various test pieces was measured. It can be seen (FIG. 2) that this desiccation increases slightly with curing temperature up to 220° C., and also above 250° C. However, desiccation is intense in the range 230° C. to 240° C. This temperature corresponds to amorphous, semi-crystalline and tobermorite hydrates being transformed into xonotlite.

In order to enable the transformation to take place completely, the sample should therefore be dry cured after demoulding at a temperature of not less than 250° C.

Curing conditions lead to the steel shavings exposed to conditions of high temperature in association with high levels of humidity. In spite of being confined in the cement matrix, carbon steel shavings are severely corroded. The iron oxides that result from such corrosion can be seen on the faces of the samples. However, by using stainless steel shavings, corrosion is greatly limited and no traces of rust can be seen on the faces.

Figure 3:
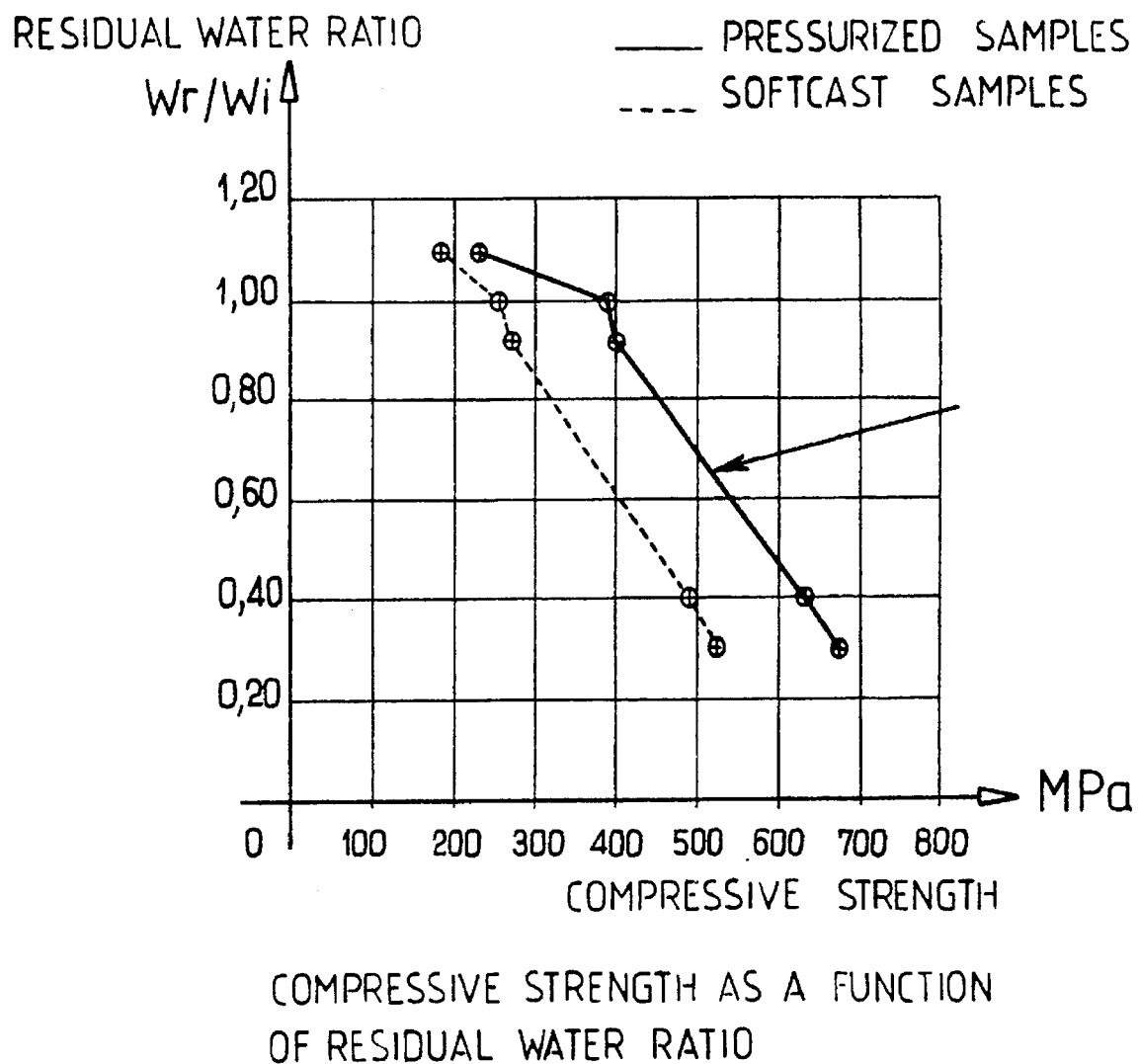
FIG. 3 is a curve of the compressive strength of a concrete element as a function of residual water ratio.

FIG. 3 shows a compressive stress as a function of residual water ratio. The latter is the ratio of the mass of water $w_r$ remaining in the sample at the time of the test to the mass of water $w_i$ initially introduced into the mix.

The mechanical performance of concrete of the invention can be improved by applying a compression pressure lying in the range 5 MPa to 50 MPa in the moulds before and during setting. More preferably, the fresh concrete is subjected, while setting, to a pressure of not less than five MPa or preferably not less than 50 MPa. The purpose of the pressure is to eliminate sample porosity due to included air, and to reduce the water content of the fresh concrete by compression.

For example, the results given in the following table were observed:

| COMPRESSIVE STRENGTH | | |
|---|---|---|
| | Curing temperature | |
| | 250° C. | 400° C. |
| Standard sample | 488 MPa | 524 MPa |
| Sample compressed during setting | 631 MPa | 673 MPa |

Conventional concrete is characterized by its strength at 28 days, as measured using a cylinder. The compressive strengths of common concretes lie in the range 25 MPa to 45 MPa. So-called "high performance" concretes have strengths in the range 50 MPa to 60 MPa. So-called "very high performance" concretes have strengths that may slightly exceed 100 MPa.

The strengths obtained with concretes of the invention lie in the range 400 MPa to 680 MPa.

Compressive strengths are measured on cylindrical samples of 7 cm in diameter and 14 cm in height. Mechanical properties for pressurized samples cured at 400° C. are given below. Fracture energies are in the range 1200 to 2000 J/m2. These values are more than ten times those obtained on conventional concrete.

| Compressive strength | 490 MPa to 680 MPa |
|---|---|
| Flexural strength | 45 MPa to 141 MPa |
| Fracture energy | 1200 J/m² to 2000 J/m² |
| Young's modulus | 65 GPa to 75 GPa |

FIG. 4 shows a scanning electron micrograph of the microstructure of a fractured sample of RPC. It can be seen that failure occurred in the paste at some distance from the paste-aggregate interface. This illustrates the high bond strength at the interface.

The concrete obtained according to the invention is a strong material that can be used as a substitute for steel. For instance prototypes of multistrand prestressing anchorage heads have already been fabricated. Protective panels made with this concrete have shown excellent performance against impacts from projectiles.

Example II

Samples of concrete were prepared by mixing components with the following proportions (in weight):

| | |
|---|---|
| Portland cement type V | 1 |
| Silica fume (mean diameter 0.5 micrometer) from zirconium industry | 0.23 |
| Ground quartz (mean diameter 4 micrometers) | 0.39 |
| Sand (mean diameter 0.5 mm) | 0.5 |
| Steel wool (as in Example I) | 0.25 |
| Steel fibers (length 12.5 mm, diameter 0.15 mm) | 0.4 |
| Superplasticizer (dry extract) | 0.02 |
| Water | 0.2 |

Superplasticizer is a polyacrylate.

Test pieces (A) of 4 cm×4 cm×16 cm and (B) of 7 cm×7 cm×28 cm are prepared with the above composition. A pressure of 580 bars is applied during setting and the pieces are cured after demolding at 90° C. and post cured at 250° C.

The flexural strength $R_f$ is measured on pieces (A) by a 3-points bending test.

The fracture energy ($G_f$) is measured on notched pieces (B).

The results are as follows:

| | $R_f$ (MPa) | $G_f$ (J/m²) |
|---|---|---|
| Compressed | 141 | 29600 |
| Not compressed | 108 | 25400 |

Such fracture energy is more than two hundred times the value obtained with conventional concretes (without metal fibers).

Example III

The invention is peculiarly useful for producing anchoring heads for prestressing cables, tendons or similar devices.

A composition as in example II (unless the steel fibers) is malaxed during 6 minutes according to the following procedure:

| 0 minute | mixing of the dry components (without the steel wool) |
|---|---|
| 1 m 30 | addition of the water and half of the superplasticizer, |
| 2 m 30 | addition of the second half of the superplasticizer, |
| 4 m | addition of the stool wool, |
| 6 m | end of mixing |

The mixture is poured thereafter in a mold having the shape of an anchoring head, while vibrating the mold. Then the mixture is compressed with a pressure of about 500 bars until the setting of the concrete. The head thus obtained is demolded, cured at 90° C. and postcured at 250° C.

The compressive strength measured on corresponding test pieces is above 600 MPa, with a maximum at 673 MPa.

Compared to a metal anchoring head, the concrete anchoring head of the invention provides a number of advantages:

the head is obtained without machining;

the weight of the head is much lower which makes use easier;

the contact of the head with the pieces fixed to the end of the prestressing cables is improved.

An anchoring head obtained according to the invention is shown on FIG. 5.

We claim:

1. A method for producing a concrete element having a compressive strength of not less than 400 MPAa and a fracture energy of not less than 1,000 J/m$^2$, comprising the steps of mixing a composition including the following components in the following proportions expressed in parts by weight wherein parts by weight is represented by "p":
   a) 100 p of Portland cement;
   b) 30 p to 100 p of fine sand having a grain size of at least 150 micrometers;
   c) 10 p to 40 p of amorphous silica having a grain size of less than 0.5 micrometers;
   d) 20 p to 60 p of ground quartz having a grain size of less than 10 micrometers;
   e) 25 p to 100 p of steel wool;
   f) a dispersing agent;
   g) 13 p to 26 p of water, and curing the concrete after setting at a temperature at least 250° C., for a length of time sufficient to transform cement hydration products into xonotlite crystalline hydrates.

2. A method according to claim 1, wherein the fine sand has a grain size of at most 800 micrometers.

3. A method according to claim 1, wherein the fine sand has a grain size in the range 150–400 micrometers.

4. A method according to claim 1, wherein the steel wool is steel shavings ground to 1 mm to 5 mm.

5. A method according to claim 1, wherein said steel wool is stainless steel wool.

6. A method according to claim 1, wherein said composition contains at least 0.6 p of a superplasticizer.

7. A method according to claim 1, wherein the composition further comprises metal fibers having a length in the range 4 mm–20 mm, and a diameter smaller than about 500 micrometers, the volume of said fibers being 1 to 4% of the volume of the concrete after setting.

8. A method according to claim 6, wherein said composition contains, per 100 p of Portland cement: 50 p of sand, 23 p of silica, 39 p of quartz, 2 p of superplasticizer, 63 p of steel wool, and 18 p of water.

9. A method according to claim 1, wherein the concrete is cured to a temperature of not less than 400° C.

10. A method according to claim 1, wherein the concrete is cured at ambient pressure and ambient humidity.

11. A method according to claim 1, wherein the concrete is subjected, while setting, to a pressure of not less than 5 MPa.

12. A composition for use in producing a concrete element comprising the following, wherein parts by weight are represented by "p":
   a) 100 p of Portland cement;
   b) 30 p to 100 p of fine sand having a grain size of at least 150 micrometers;
   c) 10 p to 40 of amorphous silica having a grain size of less than 0.5 micrometers;
   d) 20 p to 60 p of ground quartz having a grain size of less than 10 micrometers;
   e) 25 p to 100 p of steel wool;
   f) a dispersing agent; and
   g) 13 p to 26 p of water.

13. A concrete element made by the method according to claim 1.

14. The method of claim 1, wherein said fine sand ranges between 40 p and 70 p, said amorphous silica ranges between 20 p and 30 p, said ground quartz ranges between 30 p and 50 p, said steel wool ranges between 45 p and 80 p and said water ranges between 15 p and 22 p.

15. The method of claim 6, wherein said composition contains at least 1.4 p of said superplasticizer.

16. The method of claim 7, wherein said length, diameter and said volume of said metal fibers are in the range of 10 mm and 14 mm, 100 and 200 micrometers, and 2 to 3% respectively.

17. The method of claim 11, wherein said pressure is not less than 50 MPa.

* * * * *